US005789084A

United States Patent [19]
Nakamura et al.

[11] Patent Number: 5,789,084
[45] Date of Patent: Aug. 4, 1998

[54] LIQUID SILICONE RUBBER COATING COMPOSITION

[75] Inventors: Akito Nakamura; Yuichi Tsuji, both of Chiba prefecture, Japan

[73] Assignee: Dow Corning Toray Silicone Co., Ltd., Tokyo, Japan

[21] Appl. No.: 716,036

[22] Filed: Sep. 19, 1996

[30] Foreign Application Priority Data

Sep. 21, 1995 [JP] Japan ................... 7-267664

[51] Int. Cl.$^6$ ........................................ B32B 9/04
[52] U.S. Cl. ............... 428/447; 428/425.5; 428/474.4; 428/480; 524/265; 524/266; 524/731
[58] Field of Search .................... 524/265, 266, 524/731; 428/447

[56] References Cited

U.S. PATENT DOCUMENTS

| 5,120,810 | 6/1992 | Fujiki et al. ................ 524/266 |
| 5,364,921 | 11/1994 | Gray et al. .................. 524/731 |

FOREIGN PATENT DOCUMENTS

| 0 553 840 A1 | 8/1993 | European Pat. Off. . |
| 553840 | 8/1993 | European Pat. Off. . |
| 681014 | 11/1995 | European Pat. Off. . |
| 718432 | 6/1996 | European Pat. Off. . |

*Primary Examiner*—Melvyn I. Marquis
*Attorney, Agent, or Firm*—Arne R. Jarnholm

[57] ABSTRACT

A curable liquid silicone rubber coating composition is disclosed. The curable composition of the invention exhibits excellent infiltrability and can be used to for thin coatings on synthetic fabrics, without using a dilution solvent. The cured composition is tackfree coating film with excellent adherence to synthetic fabrics. The curable composition includes: (A) a diorganopolysiloxane that contains at least 2 alkenyl groups in each molecule; (B) an organopolysiloxane resin; (C) an inorganic filler; (D) an organohydrogenpolysiloxane that contains at least 2 silicon-bonded hydrogen atoms in each molecule; (E) a platinum group catalyst; (F) an epoxy-functional organosilicon compound; and (G) an organotitanium compound.

11 Claims, No Drawings

LIQUID SILICONE RUBBER COATING COMPOSITION

BACKGROUND OF THE INVENTION

1. Field of the Invention

The present invention relates to liquid silicone rubber coating compositions that are used, for example, with automotive air bags. More particularly, the present invention relates to a liquid silicone rubber coating composition that cures into a silicone rubber coating film with a tackfree surface and has an excellent capacity to form thin coating films without the use of solvent. The cured coating exhibits extensibility, and in particular exhibits an adhesive strength capable of withstanding the shock of high-temperature expansion/inflation.

2. Description of the Prior Art

Base fabrics comprising a synthetic fiber fabric (e.g., of nylon 66) coated with silicone rubber offer the advantages of good thermal characteristics, good nonflammability, and excellent resistance to deterioration with the passage of time. These advantages have led to their use in, for example, automotive air bags.

A diluting solvent such as toluene or xylene is generally used when coating the silicone rubber on the synthetic fabric in order to obtain a uniform and thin coating and achieve strong bonding with the base fabric. However, a liquid silicone rubber composition that is coatable without the use of solvent has been introduced in response to the recent environmentally inspired drive to eliminate or reduce the use of solvents (Japanese Patent Application Laid Open [Kokai or Unexamined] Number Hei 5-214295 [214,295/1993]). A drawback to fabrics coated with this composition is that the surface of the applied film presents some residual tack even after cure into the silicone rubber. When left as is, this residual tack impairs the processability during such operations as sewing and also causes adjacent films of the coating to stick to each other during storage of the folded fabric. These problems have made it necessary to dust the surface of the applied films with, for example, talc, calcium carbonate, or clay.

SUMMARY OF THE INVENTION

The curable liquid silicone rubber composition of the present invention overcomes the drawbacks of the prior art compositions. The curable liquid silicone rubber composition of the invention contains both a special class of organosilicon compound and an organotitanium compound. The uncured composition exhibits good infiltrability into synthetic fabrics and good capacity to be coated out into thin films on synthetic fabrics, without the inclusion of an organic solvent in its composition. The cured composition has strong adherence to synthetic fabrics and exhibits a low surface tack.

It is therefore an object of the present invention to provide a curable liquid silicone rubber coating composition that can be coated on synthetic fabrics and which exhibits excellent infiltrability of synthetic fabrics and excellent capacity to form thin coatings thereon, without using a dilution solvent.

It is another object of the present invention to provide a curable liquid silicone rubber coating composition that cures to form a tackfree coating film that has excellent adherence to synthetic fabrics.

The curable liquid silicone coating composition of the present invention comprises:

(A) 100 weight parts diorganopolysiloxane that has a viscosity at 25° C. of 100 to 100,000 centipoise and that contains at least 2 alkenyl groups in each molecule;

(B) 5 to 100 weight parts organopolysiloxane resin;

(C) 5 to 100 weight parts inorganic filler;

(D) organohydrogenpolysiloxane that contains at least 2 silicon-bonded hydrogen atoms in each molecule, in a quantity that affords a value from 0.6:1 to 20:1 for the ratio of the number of moles of silicon-bonded hydrogen in this component to the number of mole of alkenyl in component (A);

(E) platinum group catalyst, in a quantity that affords 0.1 to 500 weight parts platinum group metal for each one million weight parts component (A);

(F) 0.1 to 20 weight parts epoxy-functional organosilicon compound; and (G) 0.1 to 5 weight parts organotitanium compound.

The aforesaid objects of the present invention, as well as various advantages and features thereof, are explained in detail, below.

DETAILED DESCRIPTION OF THE PRESENT INVENTION

The diorganopolysiloxane (A) used in the present invention is the base ingredient of the composition according to the present invention. This component must contain at least 2 alkenyl groups in each molecule in order to obtain a rubbery elastic silicone rubber coating film from the cure of the composition according to the present invention.

The subject organopolysiloxane is a substantially linear organopolysiloxane as defined by the following average unit formula $$R_n SiO_{(4-n)/2}$$

wherein R represents substituted and unsubstituted monovalent hydrocarbon groups as exemplified by alkyl groups such as methyl, ethhyl, propyl, and so forth; alkenyl groups such as vinyl, allyl, and so forth; aryl groups such as phenyl and so forth; and haloalkyl groups such as 3,3,3-trifluoropropyl. The n in the preceding formula is from 1.9 to 2.1. This diorganopolysiloxane should have a viscosity at 25° C. from 100 to 100,000 centipoise. Viscosities at 25° C. from 1,000 centipoise to 50,000 centipoise are more preferred based on considerations of ease of mixing and the strength of the ultimately obtained silicone rubber coating film. The component under consideration is exemplified by dimethylvinylsiloxy-endblocked dimethylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, and dimethylvinylsiloxy-endblocked methyl(3, 3,3-trifluoropropyl)siloxane-methylvinylsiloxane copolymers.

The organopolysiloxane resin (B) is an essential component that improves the mechanical strength of the silicone rubber coating film and in particular improves the infiltrability and adherence of the silicone rubber coating composition according to the present invention for the synthetic fabrics used in air bags. This organopolysiloxane resin is exemplified by the following:

resins composed of the (CH3)3 SiO1/2 and SiO4/2 units;
resins composed of the (CH3)3SiO1/2, (CH2=CH)SiO3/2, and SiO4/2 units;
resins composed of the (CH2=CH) (CH3)2 SiO1/2 and SiO4/2 units; and
resins composed of the (CH2=CH) (CH3)2 SiO1/2, (CH2=CH)SiO3/2, and SiO4/2 units.

Among these, vinyl-functional resins are preferred because they improve the strength of the silicone rubber coating film.

Preferred resins are liquid at room temperature or are solid but still compatible with component (A). Based on the objectives of improving the infiltrability into synthetic fabrics while simultaneously improving the capacity for coating out into a thin film, component (B) is added at from 5 to 80 weight parts and preferably at from 10 to 80 weight parts.

The inorganic filler (C) can be those fillers whose use in silicone rubbers is known from the art for such purposes as reinforcement, viscosity adjustment, improving the heat stability, and improving the nonflammability. This inorganic filler is exemplified by reinforcing fillers such as silica micropowders (e.g., fumed silica, precipitated silica and calcined silica), fumed titanium oxide; nonreinforcing fillers such as crushed quartz, diatomaceous earth, iron oxide, aluminum oxide, calcium carbonate and magnesium carbonate; and such fillers after treatment with an organosilicon compound such as organosilane or organopolysiloxane. Ultrafine silica powders with specific surface areas of at least 50 $m^2/g$ are preferred. The optimal filler is surface-treated ultrafine silica powder, for example, silica whose surface has been preliminarily treated with compounds such as organosilane, organosilazane and diorganocyclopolysiloxane.

The amount of component (C) that is used in the composition of the invention will vary with the particular type of inorganic filler, but is generally in the range from 5 to 100 weight parts per 100 weight parts component (A). In the particular instance of the use of ultrafine silica powder as the inorganic filler, the silica should be added at from 5 to 15 weight parts per 100 weight parts component (A). The use of more than 15 weight parts silica micropowder causes the composition to have an excessively high viscosity and thereby impairs solventless coating on the air bag base fabric; the use of less than 5 weight parts results in a decline in the mechanical strength of the silicone rubber coating film.

Component (D), which is the crosslinker for the composition according to the present invention, is organopolysiloxane that contains at least 2 silicon-bonded hydrogen atoms in each molecule. This organopolysiloxane is exemplified by the following:

trimethylsiloxy-endblocked methylhydrogenpolysiloxanes, trimethylsiloxy-endblocked dimethylsiloxane-methylhydrogensiloxane copolymers, dimethylphenylsiloxy-endblocked methylphenylsiloxane-methylhydrogensiloxane copolymers, cyclic methylhydrogenpolysiloxanes, and copolymers composed of the dimethylhydrogensiloxy and $SiO_{4/2}$ units.

The viscosity of the organopolysiloxane of component (D) can generally be in the range from 1 to 1,000 centipoise. The subject organohydrogenpolysiloxane should be added in a quantity that affords values from 0.6:1 to 20:1 and preferably from 1:1 to 10:1 for the ratio of the number of moles of silicon-bonded hydrogen in the subject organohydrogenpolysiloxane to the number of moles of alkenyl groups in component (A).

The platinum group catalyst used as component (E) in the present invention is a curing catalyst for the composition according to the present invention. This component is exemplified by very finely divided platinum powder, platinum black, chloroplatinic acid, platinum tetrachloride, chloroplatinic acid-olefin complexes, alcohol solutions of chloroplatinic acid, chloroplatinic acid-alkenylsiloxane complexes, rhodium compounds, and palladium compounds. The platinum group catalyst is generally used at 0.1 to 500 weight parts and preferably at 1 to 50 parts per 1,000,000 weight parts component (A). A satisfactory development of the reaction will not occur at less than 0.1 weight part, while exceeding 500 weight parts is uneconomical.

The epoxy-functional organosilicon compound (F) is an essential component that improves the adherence of the composition according to the present invention for the synthetic fabrics used in air bags. The subject organosilicon compound is exemplified by epoxy-functional organoalkoxysilanes such as gamma-glycidoxypropyltrimethoxysilane, beta-(3,4-epoxycyclohexyl)ethyltrimethoxysilane, and so forth, and by epoxy-functional organopolysiloxanes such as epoxy-functional organopolysiloxanes that also contain silicon-bonded vinyl and alkoxy, epoxy-functional organopolysiloxanes that also contain silicon-bonded hydrogen, epoxy-functional organopolysiloxanes that also contain silicon-bonded hydrogen and alkoxy, and so forth. The following compounds are specific examples of the said epoxy-functional organopolysiloxanes (in the following structures, Me=methyl and Vi=vinyl).

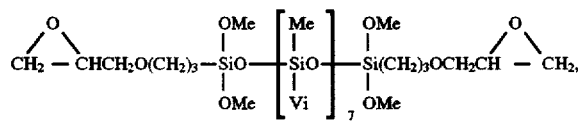

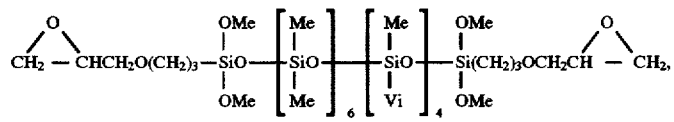

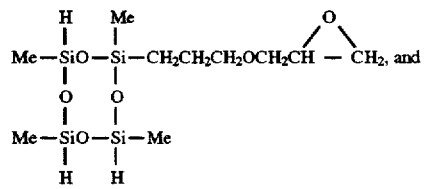

-continued

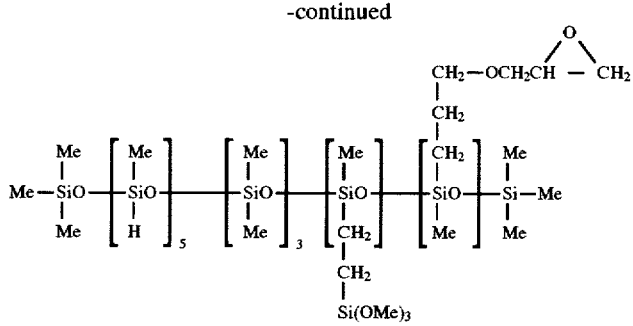

The organotitanium compound (G), which is the component that characterizes the present invention, is an essential component that improves the adherence of the composition according to the present invention for synthetic fabrics and that reduces the post-cure tack of the surface of the film coating. This organotitanium compound is exemplified by organotitanate esters such as tetraisopropyl titanate, tetrabutyl titanate, tetraoctyl titanate, and so forth, and by titanium chelate compounds such as diisopropoxybis(acetylacetonato)titanium, diisopropoxybis(ethyl acetoacetate)titanium, and so forth. This component is added at from 0.1 to 5 weight parts per 100 weight parts component (A). The use of more than 5 weight parts of this component causes a deterioration in the storage stability of the composition according to the present invention. When used at less than 0.1 weight part, this component will not manifest its function of reducing the tack of the surface of the film coating after cure into the silicone rubber.

In addition to the components (A) to (G) described above, the composition according to the present invention preferably also contains a cure retarder as a component (H). This cure retarder is exemplified by alkyne alcohols such as 3-methyl-1-butyn-3-ol, 3,5-dimethyl-1-hexyn-3-ol, phenylbutynol, and so forth; ene-yne compounds such as 3-methyl-3-penten-1-yne, 3,5-dimethyl-3-hexen-1-yne, and so forth; tetramethyltetrahexenylcyclotetrasiloxane; benzotriazole; etc. The cure retarder is generally used at 0.01 to 10 weight parts per 100 weight parts component (A). The composition according to the present invention can be prepared simply by the preparation of a homogeneous mixture using a mixer such as, for example, a kneader mixer, kneader mixer equipped with a ram cover, Ross mixer, and so forth. Various optional components, for example, pigments, heat stabilizers, etc., can be admixed insofar as the object of the invention is not impaired.

The silicone rubber-coated fabric can be prepared by coating the composition according to the present invention on a synthetic fiber fabric and then curing the composition. Useful synthetic fabrics are exemplified by fabrics made from polyamide fibers such as nylon 6, nylon 66 and nylon 46; fabrics made from aramid fibers; fabrics made from polyesters, for which the typical example is polyethylene terephthalate; fabrics made from polyetherimide fibers; fabrics made from sulfone fibers; and fabrics made from carbon fibers. Nylon 66 fabrics are the most preferred among the preceding.

To produce the silicone rubber-coated fabric of the invention, the composition according to the present invention as described above is coated onto the synthetic fabric followed by introduction into a hot-air drying oven for heating and curing. The silicone rubber composition is generally applied at a rate not exceeding 80 g/m$^2$. The heating and curing step affords a flexible coated fabric in which the silicone rubber coating film and synthetic fabric have been tightly bonded into a single body at an adhesive strength of at least 1.5 kgf/cm. Moreover, no tack is exhibited by the surface of the coating film on coated fabric prepared by application of the composition according to the present invention. As a result, even in the absence of dusting with, for example, talc or calcium carbonate, this tackfree condition for the subject coated fabric makes possible an excellent processability in operations such as sewing, and also eliminates sticking between adjacent coating films during storage in a folded state.

EXAMPLES

The present invention is explained in greater detail below through working examples. In these examples, "parts" denotes "weight parts," the values reported for the viscosity were measured at 25° C., Me represents the methyl group, and Vi represents the vinyl group.

Example 1

100 parts dimethylvinylsiloxy-endblocked dimethylpolysiloxane with a viscosity of 2,000 centipoise and 30 parts vinyl-functional methylpolysiloxane resin (vinyl content= 5.6%, viscosity=230 centipoise) composed of the Vi(Me)$_2$SiO$_{1/2}$ an SiO$_{4/2}$ units were introduced into a Ross mixer. The following were subsequently added with mixing to homogeneity: 12 parts fumed silica with a specific surface area of 200 m$_2$/g, 5 parts hexamethyldisilazane as surface-treatment agent for the silica, and 2 parts water. Heating in a vacuum then afforded a liquid silicone rubber base with a fluid consistency.

The following were mixed to homogeneity into 100 parts of this liquid silicone rubber base to yield a liquid silicone rubber coating composition; 6 parts methylhydrogenpolysiloxane with the average molecular formula Me$_3$SiO(MeHSiO)$_6$(Me$_2$SiO)$_4$SiMe$_3$, 0.5 part chloroplatinic acid-divinyltetramethyldisiloxane complex (platinum concentration=0.4 weights), 0.4 part 3,5-dimethyl-1-hexyn-3-ol as curing inhibitor, 1 part gamma-glycidoxypropyltrimethoxysilane as adhesion promoter, and 0.5 part tetrabutyl titanate as tack inhibitor. This composition had a viscosity of 26,000 centipoise. The composition was coated on a nylon 66 fiber fabric (420 denier) and was cured by heating for 2 minutes at 180° C. The fabric coating technique consisted of application of the liquid silicone rubber coating composition with a coater using the minimum quantity capable of giving a uniform and even coating. Two coated and cured surfaces of this coated fabric were laid one on top of the other and bonded to one another through an interposed layer of a room-temperature-curable silicone rubber adhesive (SE9145 RTV from Dow Corning Toray Silicone Company, Limited). After curing at room temperature for 7 days, a strip 2.5 cm in width by 10 cm in length was cut out and subjected to a peel test, during which the adhesive strength was measured. A Scott flexing test (ASTM D430-95) was also run using a Scott flexing machine: delamination of the thin silicone rubber coating film from the surface of the fabric was visually inspected after 1,000 cycles with a 2 kgf flexing load. The tack of the surface of the coating film was evaluated by touch with a finger.

To measure the infiltrability, a synthetic fabric for air bag service was cut into a strip (2 cm width by 10 cm length) and this strip was hung vertically. Its bottom end was then dipped (0.5 mm) into the liquid silicone rubber composition. This setup was allowed to stand undisturbed for 24 hours at room temperature, at which point the infiltration distance of the liquid silicone rubber composition into the base fabric was measured. A small quantity of a pigment was added to the silicone rubber composition in this test in order to facilitate determination of the area of infiltration by the liquid silicone rubber composition into the base fabric.

The results of these property measurements are reported in Table 1 below.

Comparative Example 1

A liquid silicone rubber coating composition was prepared as in Example 1, but in this case without the addition of the tetrabutyl titanate that was used in Example 1. The properties of this composition were measured as in Example 1, and the obtained results are reported in Table 1 below.

TABLE 1

| Test/Property | Example 1 | Comparative Example 1 |
|---|---|---|
| durometer of the silicone rubber (JIS A) | 52 | 50 |
| minimum coating weight (g/m²) | 40 | 40 |
| adhesive strength (kgf/cm) | 3.5 | 2.5 |
| Scott flexing test | passes | passes |
| infiltrability (cm) | 2.3 | 2.4 |
| tack | none | present |

Example 2 and Comparative Example 3

For Example 2 and Comparative Example 2, the liquid silicone rubber coating compositions prepared in Example 1 and Comparative Example 1 were respectively coated as in Example 1 on a polyester fiber fabric (420 denier) to give silicone rubber-coated fabrics. The properties of these silicone rubber-coated fabrics were measured, and these results are reported in Table 2 below.

TABLE 2

| Test/Property | Example 2 | Comparative Example 2 |
|---|---|---|
| durometer of the silicone rubber (JIS A) | 52 | 50 |
| minimum coating weight (g/m²) | 42 | 44 |
| adhesive strength (kgf/cm) | 3.0 | 2.2 |
| Scott flexing test | passes | passes |
| infiltrability (cm) | 2.0 | 2.2 |
| tack | none | present |

Example 3 and Comparative Example 3

100 parts dimethylvinylsiloxy-endblocked dimethylpolysiloxane with a viscosity of 12,000 centipoise and 20 parts vinyl-functional methylpolysiloxane resin (vinyl weight= 5.6%, Viscosity=230 centipoise) composed of the Vi(Me)2 SiO1/2 and SiO4/2 units were introduced into a Ross mixer. 10 parts fumed silica (specific surface area=200 m²/g) that had been preliminarily treated with hexamethyldisilazane was then added with mixing to homogeneity to yield a liquid silicone rubber base with a fluid consistency.

The following were mixed to homogeneity into 100 parts of this liquid silicone rubber base to yield a liquid silicone rubber coating composition: 3 parts methylhydrogenpolysiloxane with the average molecular formula

(silicon-bonded hydrogen content=1.57 weight %), 0.5 part chloroplatinic acid-divinyltetramethyldisiloxane complex (platinum concentration=0.4 weight), 0.1 part methyltris(3-methyl-1-butyn-3-oxy)silane as curing inhibitor, as adhesion promoter 1 part of the epoxy-functional organosiloxane compound

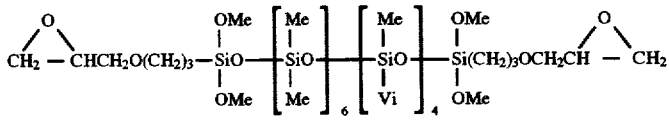

(Me=methyl, Vi=vinyl) and 2 parts diisopropoxybis(ethyl acetoacetate)titanium as tack inhibitor. This liquid silicone rubber composition had a viscosity of 58,000 centipoise. This composition was coated as in Example 1 on nylon 66 fiber fabric and the adherence, capacity for coating out into a thin film, infiltrability, and tack were evaluated. In the Comparative Example 3, a liquid silicone rubber coating composition was prepared as above, but without the addition of the diisopropoxybis(ethyl acetoacetate)titanium that was used in the above-described silicone rubber coating composition. The results of the evaluations are reported in Table 3 below.

TABLE 3

| Test/Property | Example 3 | Comparative Example 3 |
|---|---|---|
| durometer of the silicone rubber (JIS A) | 47 | 44 |
| minimum coating weight (g/m$^2$) | 42 | 45 |
| adhesive strength (kgf/cm) | 3.3 | 2.2 |
| Scott flexing test | passes | passes |
| infiltrability (cm) | 1.8 | 1.8 |
| tack | none | present |

Because the liquid silicone rubber coating composition according to the present invention comprises components (A) to (G) and in particular because it contains the organotitanium compound (G) in addition to the organosiloxane resin (B) and epoxy-functional organosilicon compound (F), it is characterized by: an excellent infiltrability for and strong adherence to synthetic fabrics (e.g., of nylon 66); an excellent capacity to form thin coating films on synthetic fabrics; and a facile coatability without the use of a dilution solvents Moreover, since the surface of the cured coated film on silicone rubber-coated fabric afforded by the application of the instant silicone rubber coating composition is tackfree, even without dusting the coated film surface with, for instance, talc or calcium carbonate, this fabric has an excellent processability in such operations as sewing and is free of the problem of sticking between adjacent coating films during storage in a folded condition.

What is claimed is:

1. A curable liquid silicone rubber coating composition comprising:

(A) 100 weight parts of a diorganopolysiloxane that has a viscosity at 25° C. of 100 to 100.000 centipoise and that contains at least 2 alkenyl groups in each molecule;

(B) 5 to 100 weight parts of an organopolysiloxane resin selected from the group consisting of resins composed of the $(CH_3)_3SiO_{1/2}$ and $SiO_{4/2}$ units, resins composed of the $(CH_3)_3SiO_{1/2}$, $(CH_2=CH)SiO_{3/2}$, and $SiO_{4/2}$ units, resins composed of the $(CH_2=CH)(CH_3)_2SiO_{1/2}$ and $SiO_{4/2}$ units, and resins composed of the $(CH_2=CH)(CH_3)_2SiO_{1/2}$, $(CH_2=CH)SiO_{3/2}$, and $SiO_{4/2}$ units;

(C) 5 to 100 weight parts of an inorganic filler;

(D) an organohydrogenpolysiloxane that contains at least 2 silicon-bonded hydrogen atoms in each molecule
said organohydrogenpolysiloxane (D) being present in a quantity such that the ratio of the number of moles of silicon-bonded hydrogen in (D) to the number of moles of said alkenyl groups in (A) is from about 0.6:1 to about 20:1;

(E) 0.1 to 500 weight parts of a platinum group catalyst per one million weight parts component (A);

(F) 0.1 to 20 weight parts of an epoxy-functional organosilicon compound; and (G) 0.1 to 5 weight parts organotitanium compound.

2. A composition in accordance with claim 1 wherein said organohydrogenpolysiloxane (D) is present in a quantity such that the ratio of the number of moles of silicon-bonded hydrogen in (D) to the number of moles of said alkenyl groups in (A) is from about 1:1 to about 10:1.

3. A curable liquid silicone rubber coating composition in accordance with claim 1 wherein component (F) is epoxy-functional organopolysiloxane.

4. A curable liquid silicone rubber coating composition in accordance with claim 1 wherein component (G) is an organotitanate ester or a titanium chelate.

5. A composition in accordance with claim 1 wherein said diorganopolysiloxane (A) is selected from the group consisting of dimethylvinylsiloxy-endblocked dimethylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, and dimethylvinylsiloxy-endblocked methyl(3,3,3-trifluoropropyl)siloxane-methylvinylsiloxane copolymers.

6. A composition in accordance with claim 1 wherein said epoxy-functional organosilicon compound (F) is selected from the group consisting of

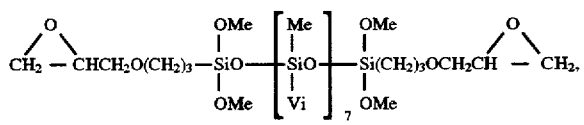

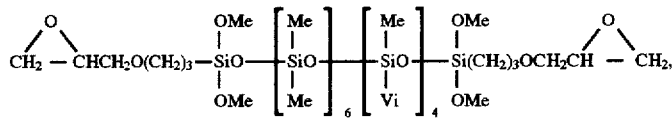

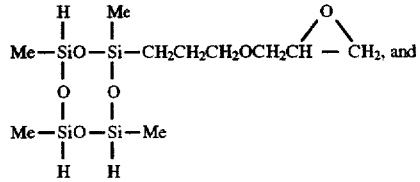

-continued

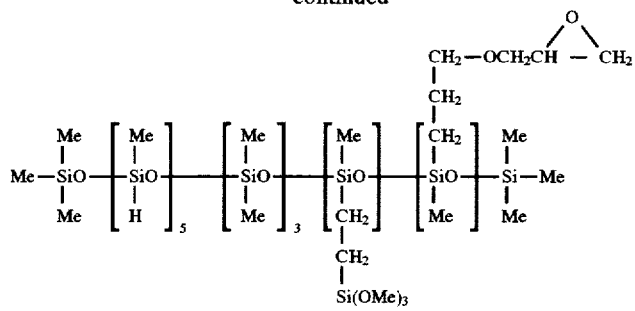
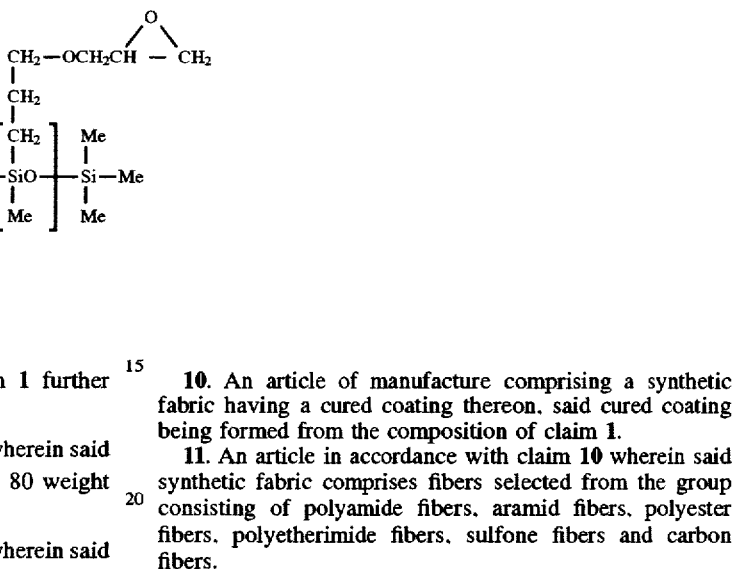

7. A composition in accordance with claim 1 further comprising (H) a cure retarder.

8. A composition in accordance with claim 1 wherein said organopolysiloxane resin (B) is present in 5 to 80 weight parts.

9. A composition in accordance with claim 8 wherein said organopolysiloxane resin (B) is present in 10 to 80 weight parts.

10. An article of manufacture comprising a synthetic fabric having a cured coating thereon, said cured coating being formed from the composition of claim 1.

11. An article in accordance with claim 10 wherein said synthetic fabric comprises fibers selected from the group consisting of polyamide fibers, aramid fibers, polyester fibers, polyetherimide fibers, sulfone fibers and carbon fibers.

* * * * *